(12) United States Patent
Klish

(10) Patent No.: US 6,226,674 B1
(45) Date of Patent: May 1, 2001

(54) METHOD FOR EXTENDING OSI PING FUNCTION CAPABILITY

(76) Inventor: Cypryan T. Klish, 9100 Tealby Pl., Raleigh, NC (US) 27615

( * ) Notice: Subject to any disclaimer, the term of this patent is extended or adjusted under 35 U.S.C. 154(b) by 0 days.

(21) Appl. No.: 09/097,627

(22) Filed: Jun. 16, 1998

(51) Int. Cl.[7] .................................................. G06F 13/00
(52) U.S. Cl. ......................................... 709/223; 709/249
(58) Field of Search ............................. 455/426; 342/37; 709/218, 249, 200, 238, 239, 242, 223; 370/392, 389, 85.13, 15; 364/148

(56) References Cited

U.S. PATENT DOCUMENTS

| | | | | |
|---|---|---|---|---|
| 4,745,593 | * | 5/1988 | Stewart | 370/15 |
| 5,461,624 | * | 10/1995 | Mazzola | 370/85.13 |
| 5,600,637 | * | 2/1997 | Kikuta | 370/389 |
| 5,684,954 | * | 11/1997 | Kaiserswerth et al. | 709/200 |
| 5,748,905 | * | 5/1998 | Hauser et al. | 709/249 |
| 5,781,431 | * | 7/1998 | Duret et al. | 364/148 |
| 5,798,726 | * | 8/1998 | Schuchman et al. | 342/37 |
| 5,842,125 | * | 11/1998 | Modzelesky et al. | 455/426 |
| 5,917,820 | * | 6/1999 | Rekhter | 370/392 |
| 5,974,452 | * | 10/1999 | Karapetkov et al. | 709/218 |

OTHER PUBLICATIONS

Katz et al, TUBA: Replacing IP with CNLP. IEEE, 1993.*
Terada et al, A High speed Protocol processor to execute OSI, IEE, 1991.*
tanaka et al, A CNLP based protocol for mobile end systems within an Area, IEEE, 1993.*
Braun et al, A Transputer based OSI–Gateway for LAN–interconnection across ISDN, IEEE, 1991.*
Zitterbart, Parallel protocol implementations on Transputer, IEEE, 1992.*

* cited by examiner

Primary Examiner—Robert B. Harrell
Assistant Examiner—Thong Vu

(57) ABSTRACT

In an open systems interconnect (OSI) environment, a method for determining whether a destination system is reachable even if the destination system does not support the CLNP Echo Function. The method engages three OSI Stack CLNP functions: the error reporting function, the route recording function, and the CLNP Echo function. The method analyses the re

2 Claims, 2 Drawing Sheets

METHOD FOR EXTENDING OSI PING FUNCTION CAPABILITY

BACKGROUND OF THE INVENTION

1. Technical Field

The present invention pertains to the field of Open Systems Interconnect (OSI) compliant computer systems, including any OSI-compliant telecommunication management systems. More particularly, the present invention pertains to a method of determining whether an element in a network of OSI-compliant systems is reachable from an interrogating system.

2. Description of Related Art

The inclusion of OSI stacks in a telecommunication management network, which encompasses all transport network elements (NEs), is a relatively new but complex technology lacking in robust diagnostic tools. New tools are needed that can save time in troubleshooting network failures. One such tool is a way of eliminating misleading reports of the result of a ping request, i.e. a request issued by a user through a requesting system to determine whether a destination system is reachable, at the time, from the user's location.

In the prior art, when a user pings a destination system under OSI, the destination system is to echo the ping, using an OSI echo function. If the requesting system does not receive an echo in response to a ping, the requesting system reports the failure to the user. However, a destination system may be reachable and yet not able to echo a ping; in order to echo a ping, a destination system must support the OSI echo function. Thus, the failure report according to the prior art may be misleading.

OSI uses a so-called Connectionless Network Protocol (CLNP), which has three basic building blocks: the CLNP echo function, the route recording function, and the error reporting function, as specified in ISO 8473. Under current practice the error reporting function is not enabled and its output is not coordinated with the other functions when a pinging system formulates an OSI ping user response. Thus, a user will receive a misleading result when a pinged destination system is reachable but does not support the CLNP echo function, since although the destination system will be reached by the request, the request will be discarded.

What is needed is a method of executing the OSI ping function to determine status of a destination system and analyzing the result so as not to report an abnormal status merely because the destination system does not have a CLNP echo capability.

SUMMARY OF THE INVENTION

According to the present invention, misleading reports of the result of pinging a destination system are eliminated by pinging the destination system by issuing, with error reporting and route recording enabled, a CLNP echo request protocol data unit (PDU). Then have the OSI ping analysis function interpret the echo response using error reporting PDUs in a way that determines whether the destination system has CLNP echo capability. After enabling error reporting and route recording, and after pinging a destination system by issuing a CLNP echo request PDU, the full OSI ping analysis according to the present invention proceeds according to the pseudocode:

If no response, then result=fail;
Else if CLNP echo response PDU received, then result=success;
Else if error report received with reason="function not supported" and source address=ping destination address, then result=success;
Else result=fail, intermediate system;

By enabling error reporting when the echo request is issued, the destination system is forced to respond with an error report including the message, function not supported. By coordinating this error response with the request, the OSI ping analysis function can determine that although the destination system does not support the echo function, the destination system is still reachable.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
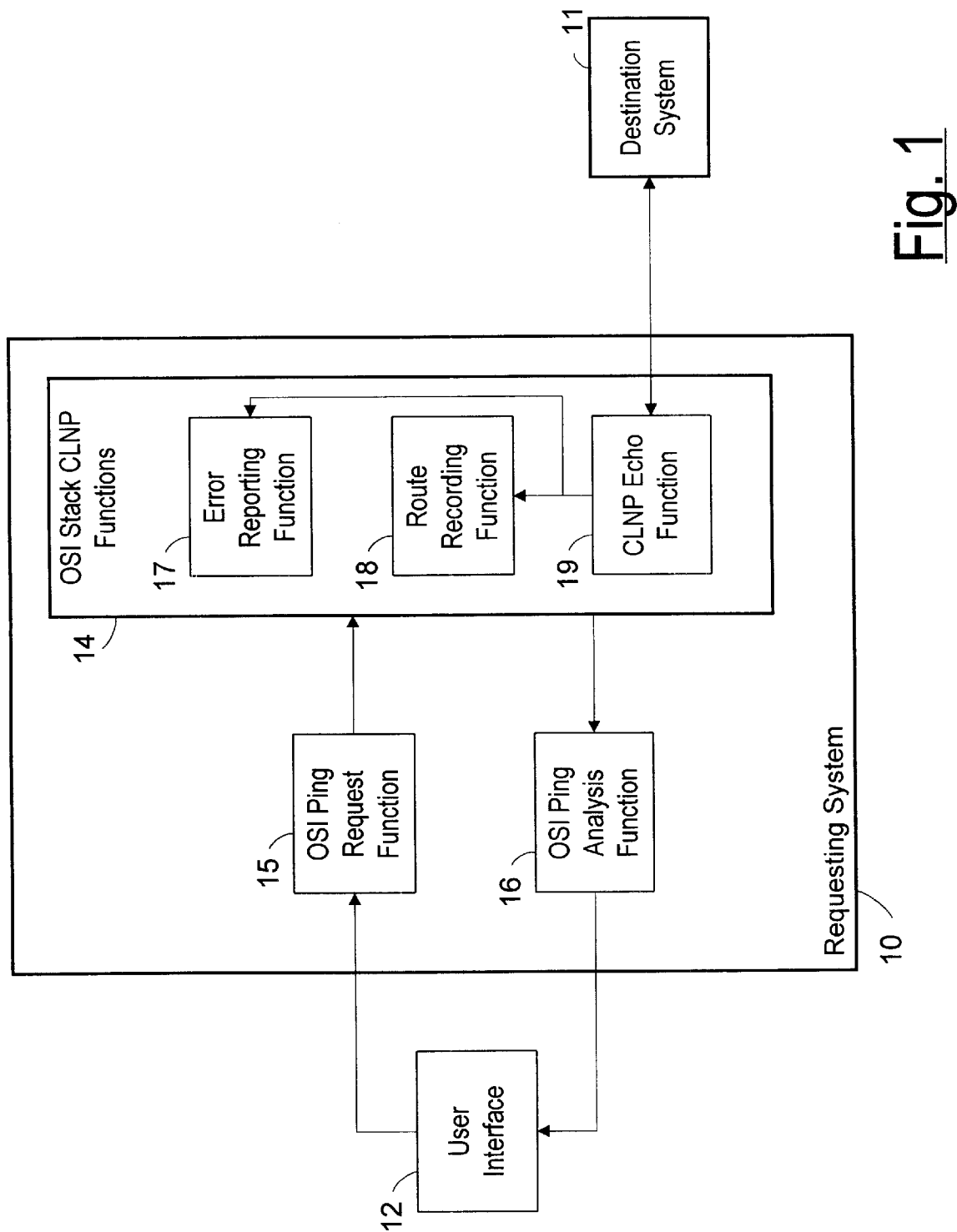
FIG. 1 is a block diagram illustrating entities of a network cooperating according to the present invention.

Referring now to FIG. 1, a user, not shown, determines whether a destination system 11 is reachable from a requesting system 10 having a user interface 12. To do this, the user interface engages within the requesting system an OSI Ping Request Function 15, which in turn engages the OSI Stack CLNP Functions 14, including the Error Reporting Function 17, the Route Recording Function 18, and the CLNP Echo Function 19. With the Error Reporting Function and Route Recording Function enabled, the CLNP Echo Function issues a CLNP Echo Request PDU to the destination system 11. The response of the destination system is received by the CLNP Echo Function 19, from which the Route Recording Function and Error Reporting Function also learn of the response. All three OSI Stack CLNP functions communicate their interpretation of the response from the destination system to an OSI Ping Analysis Function 16, which examines the information from each OSI Stack CLNP function and provides an integrated report to the user interface 12. The OSI Ping Analysis Function will report either: Success; Fail, Intermediate System; or Fail, depending on whether the destination system is reachable and whether it supports the CLNP echo function, as explained below.

Figure 2:
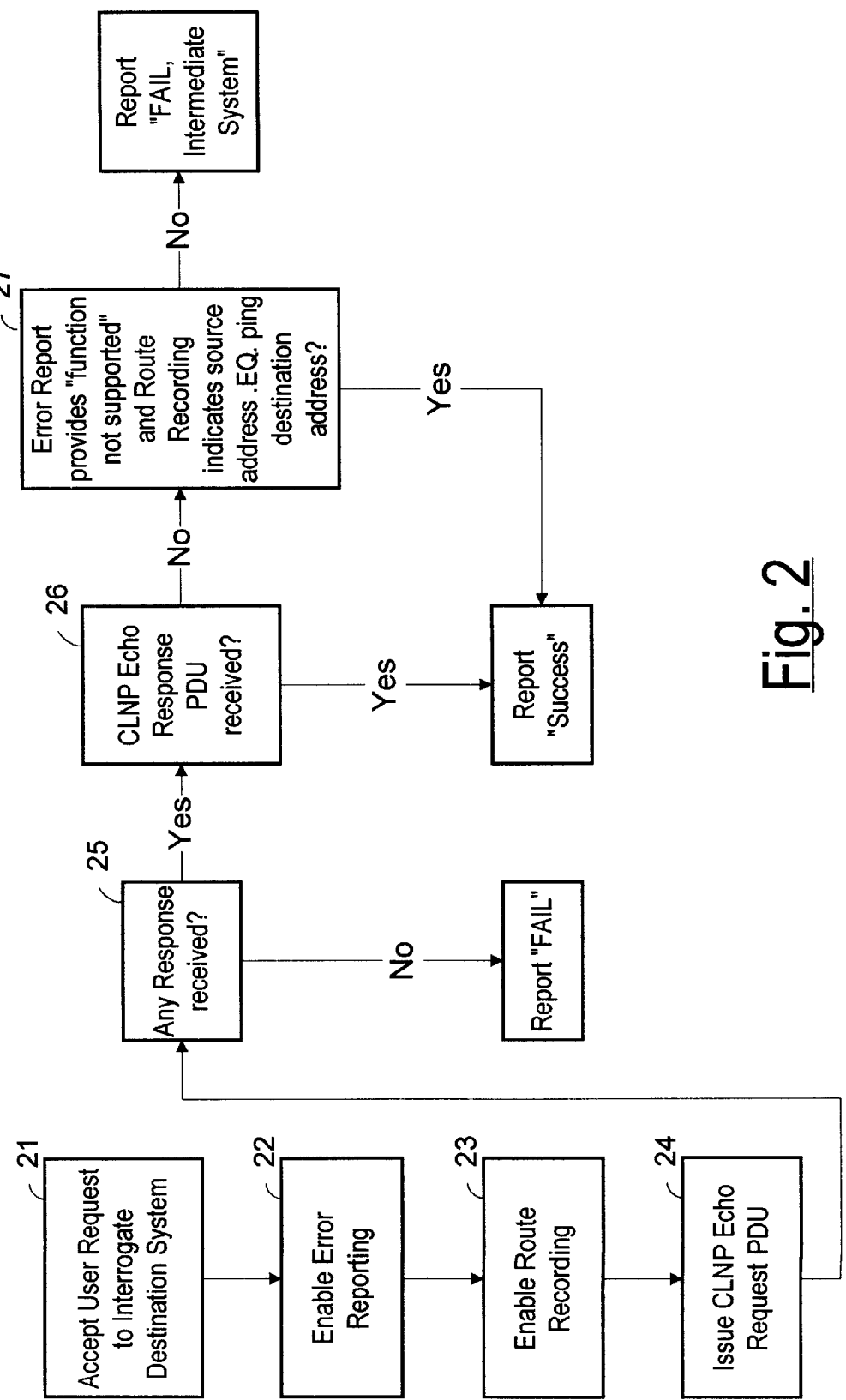
FIG. 2 is a flow chart illustrating the present invention.

In FIG. 2, the method of the present invention is represented as a flow chart, and illustrates the reasoning leading to each of the three different possible responses by the OSI Ping Analysis Function 16. Referring now to both FIG. 1 and FIG. 2, in a step 21, a requesting system 10 accepts a user request to interrogate a destination system. Then, in a next step 22, the requesting system enables error reporting, and in a step 23, the requesting systems enables route reporting. The requesting system 10 in a step 24 then issues a CLNP Echo Request PDU to the destination system 11. If the destination system is reachable and supports the CLNP echo function, it responds to the requesting system 10 with a proper response.

If the destination system is reachable but does not support the CLNP echo function then a response is received by the requesting system, but the response causes the Error Reporting Function 17 to assert that the CLNP Echo Function is not supported, and causes the Route Recording Function 18 to assert that the source of the improper response is the destination system. The destination system is, nonetheless, reachable in this case.

The requesting system may also receive a response but not from the destination system. In that case, the Route Recording Function will indicate that the source of the response is not the destination system. The destination system in this case is not reachable. Finally, the requesting system may receive no response. In that case, the destination system is not reachable.

The output of each of the three OSI Stack CLNP functions is available to the OSI Ping Analysis Function 16, which examines first, in a step 25, whether any response has been received. If not, the OSI Ping Analysis function reports Fail.

Next, in a step 26, the OSI Ping Analysis Function determines whether an Echo Response PDU has been received, i.e. whether a proper response has been received. If so, then the OSI Ping Analysis Function responds through the user interface with a report of Success.

If a CLNP Echo Response PDU is not received, then in a step 27, the OSI Ping Analysis Function determines whether the Error Reporting Function 17 has provided "function not supported" and also whether the Route Reporting Function 18 indicates that the source address is the same as the destination address. If the answer to both of these queries is yes, then the OSI Ping Analysis Function again reports Success, because even though an improper response was received, it was received from the destination address, which must therefore have been reachable.

If the answer to either of the queries asked in step 27 is no, then, as indicated in step 28, the OSI Ping Analysis Function will report Fail, Intermediate System.

The method of the present invention is not confined to the order of the steps provided here because, for example, the OSI Ping Analysis function could determined the Fail, Intermediate System result by examining a received CLNP PDU to learn whether the source of the response is the address of the destination system. Thus, the OSI Ping Analysis Function might examine the CLNP PDU before step 26 to determine whether the response received is from an intermediate system.

Thus, according to the method of the present invention, regardless of whether the destination system supports the CLNP Echo Function, the requesting system will report Fail (or Fail, Intermediate System) only if the destination system is not reachable.

It is to be understood that the above-described arrangements are only illustrative of the application of the principles of the present invention. Numerous modifications and alternative arrangements may be devised by those skilled in the art without departing from the spir

What is claimed is:

1. A method for pinging a destination system, the method for exercise by a requesting system, the requesting system supporting Open Systems Interconnect (OSI) Stack Connectionless Network Protocol (CLNP) Functions, including at least an Error Reporting Function, a Route Recording Function, and a CLNP Echo Function, the method comprising the steps in which the requesting system:

a) enables the Error Reporting Function;

b) enables the Route Recording Function;

c) issues a CLNP echo request PDU;

d) reports Fail if the requesting system receives no response;.

e) reports Success if the requesting system receives a proper response from the destination system; and f) if the requesting system does not receive a proper response from the destination system, analyzes the result of the CLNP echo request PDU accounting for information provided by the Route Recording Function and the Error Reporting Function.

2. A method as claimed in claim 1, wherein, in analyzing the result of the CLNP echo request PDU, the requesting system reports Success if the requesting system ascertains from the Route Recording Function that the response is from the destination system, and also ascertains from the Error Reporting Function that the destination system does not support the CLNP echo function, and otherwise reports Fail, Intermediate System.

* * * * *